Figure 1:
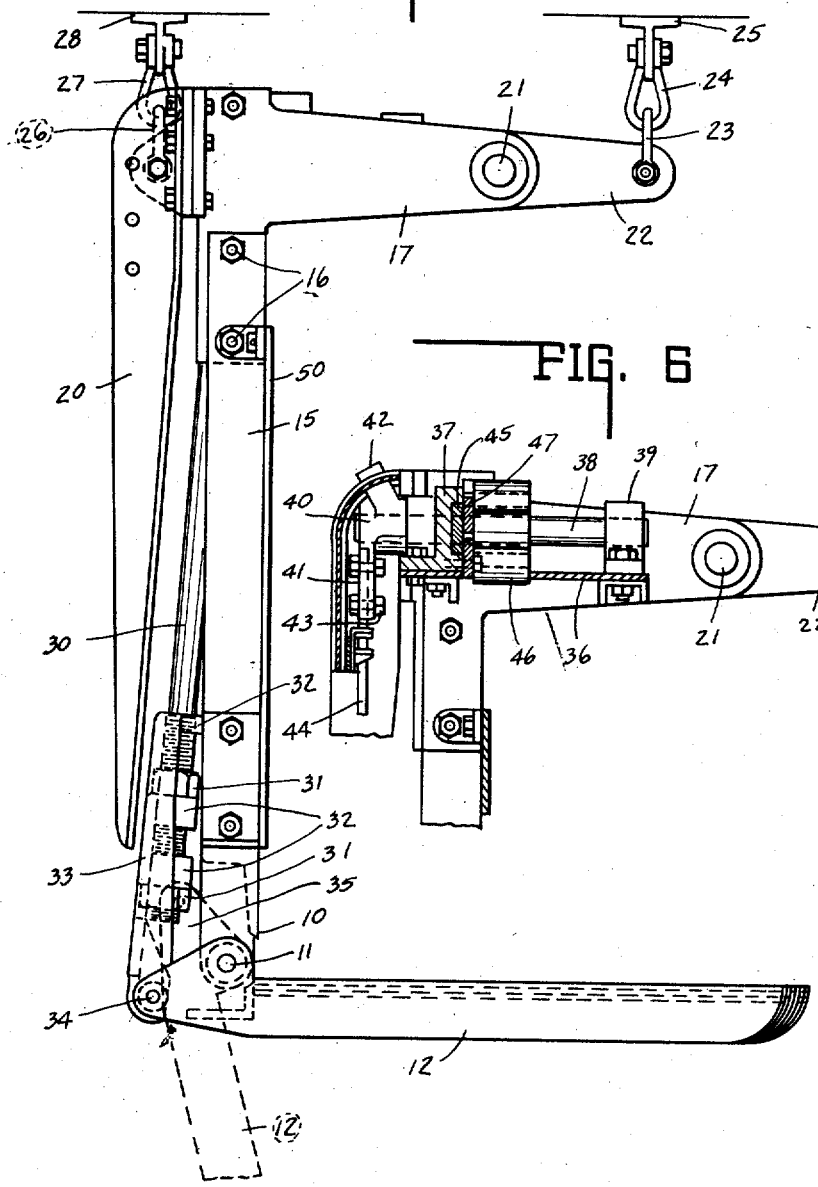

Dec. 29, 1931. W. W. WALLACE Re. 18,309

DUMPING FORK

Original Filed June 7, 1927 4 Sheets-Sheet 1

INVENTOR.
WILLIAM W. WALLACE, DECEASED,
NEW YORK BRICK HANDLING CORPORATION, ASSIGNEE,
BY
Lockwood Lockwood Goldsmith & Gatt
ATTORNEYS.

Dec. 29, 1931. W. W. WALLACE Re. 18,309

DUMPING FORK

Original Filed June 7, 1927 4 Sheets-Sheet 2

INVENTOR,
WILLIAM W. WALLACE, DECEASED,
NEW YORK BRICK HANDLING CORPORATION, ASSIGNEE,
BY
Lockwood Lockwood Goldsmith & Gall
ATTORNEYS.

Dec. 29, 1931. W. W. WALLACE Re. 18,309
DUMPING FORK
Original Filed June 7, 1927 4 Sheets-Sheet 3
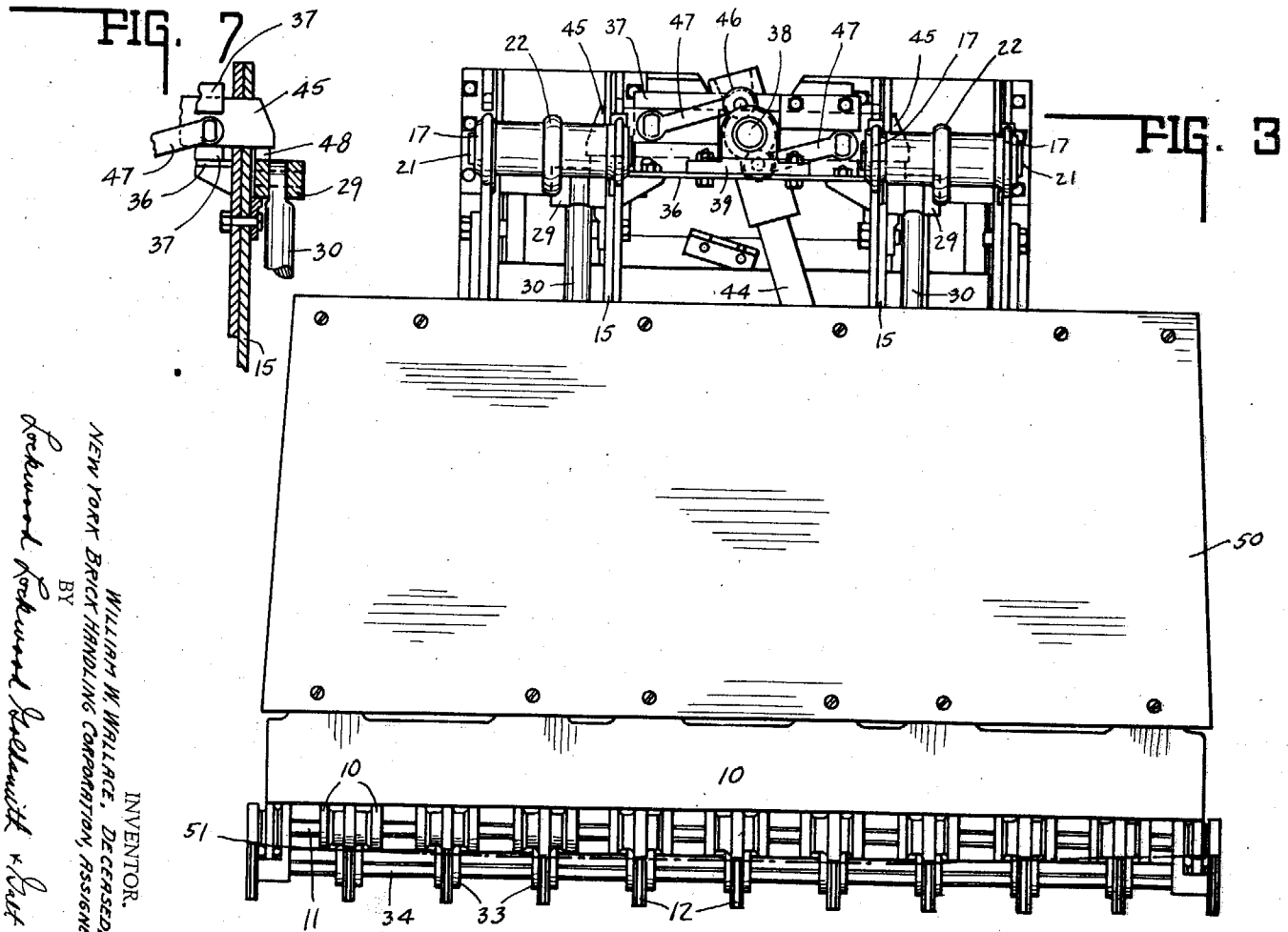
INVENTOR.
WILLIAM W. WALLACE, DECEASED,
NEW YORK BRICK HANDLING CORPORATION, ASSIGNEE,
BY
Lockwood Lockwood Goldsmith & Gall
ATTORNEYS.

Dec. 29, 1931. W. W. WALLACE Re. 18,309

DUMPING FORK

Original Filed June 7, 1927 4 Sheets-Sheet 4

INVENTOR.
WILLIAM W. WALLACE, DECEASED,
NEW YORK BRICK HANDLING CORPORATION, ASSIGNEE,
BY
Lockwood Lockwood Goldsmith & Galt
ATTORNEYS.

Reissued Dec. 29, 1931

Re. 18,309

UNITED STATES PATENT OFFICE

WILLIAM W. WALLACE, DECEASED, LATE OF NEW YORK, N. Y., BY NEW YORK BRICK HANDLING CORPORATION, ASSIGNEE, OF NEW YORK, N. Y., A CORPORATION OF NEW YORK

DUMPING FORK

Original No. 1,745,839, dated February 4, 1930, Serial No. 197,027, filed June 7, 1927. Application for reissue filed June 18, 1931. Serial No. 545,340.

This invention relates to brick handling devices, and more particularly to an improved dumping fork.

With the advent of railroad container cars and the rapid use of such cars in the transportation of the finished brick from the yard to the delivery point or destination thereof, considerable difficulty has been experienced in utilizing mechanical loading and unloading devices to economically fill such containers. To economically fill such containers with mechanically handled brick, it is practically necessary for the lifting or dumping fork with its load or unit of brick to be deposited in such container and gently placed to unload the unit load of brick in the bottom of the container. The containers being relatively small and the lifting fingers of the ordinary dumping fork being rigid with respect to the frame of the lifting or dumping fork, there is not room to retract the lifting fork from the unit of brick. Where a lifting or dumping fork with pivoted fingers is employed, there is so large a fulcrum or leverage to permit retracting of the lifting fingers in dumping the load that it is impossible to utilize such construction in a confined space such as is found in container cars. Further, the operating means for tripping the lifting fingers is ordinarily arranged to operate from below the fork rather than from above the same. There was, therefore, prior to the present invention, no dumping fork which could be successfully employed in loading container cars with brick or other like articles.

In the present invention the difficulties enumerated above with respect to former types of dumping forks are obviated and there is produced a dumping fork in which the fingers are pivotally arranged at the lower end of the fork frame and the increased leverage necessary to successfully lock the fingers in normal or rigid position is obtained by utilizing the force necessary to lift the load or unit of brick itself and when once locked, the weight of the load will retain the fingers in locked position.

By this construction, a dumping fork is provided wherein the mechanism extending to the rear of the fork or fork frame is a minimum and such fork may be operated in a small space. Further, the operating mechanism for releasing the pivoted lifting fingers to thereby allow the unit load of brick to be deposited within the container may be operated from either above or below the lifting fork, and, therefore, one of the chief difficulties is successfully overcome.

To facilitate entering the fork under the unit of brick, the portion of the lifting fingers to the rear of the actual lifting surface is beveled back, as such construction assists in entering the fork under the unit of brick when the front ends of the fingers are somewhat elevated. Again, the outer ends of the lifting fingers are arranged higher than the ends of the fingers adjacent to the fulcrum thereof, as with such construction the load is naturally balanced toward the back of the machine and thus bricks are prevented from falling off the unit. It has been further found desirable to provide guard plates, both for the front of the frame carrying the lifting fingers and for the rear thereof, as such frame protects the various devices from injury by the bricks themselves and from injury by engagement with the walls of the container.

The principal object of the invention, therefore, is an improved dumping fork.

A further object of the invention is an improved dumping fork having a plurality of parallelly arranged and pivoted lifting fingers.

A still further object of the invention is an improved dumping fork provided with locking means for the pivoted lifting fingers.

Another object of the invention is an improved guard device for protecting the operating mechanism of a dumping fork.

A further object of the invention is an improved construction whereby a unit load of brick will be carried in a position to prevent the outer bricks thereof from falling.

Other objects and novel features of the construction and arrangement of parts comprising the device will appear as the description of the invention progresses.

Figure 6:
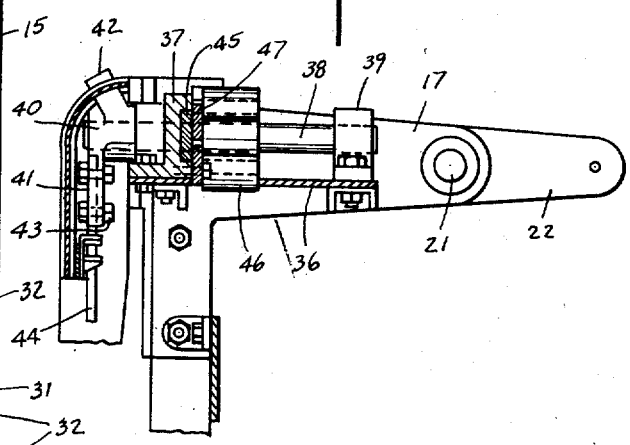
Figure 2:
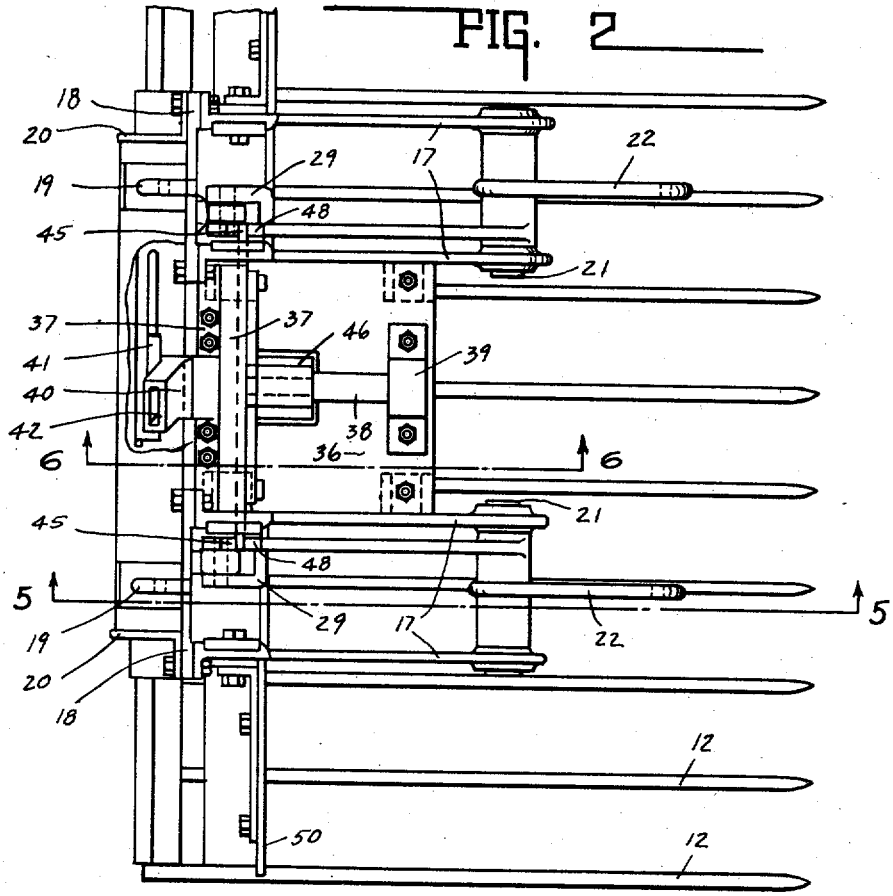
Figure 5:
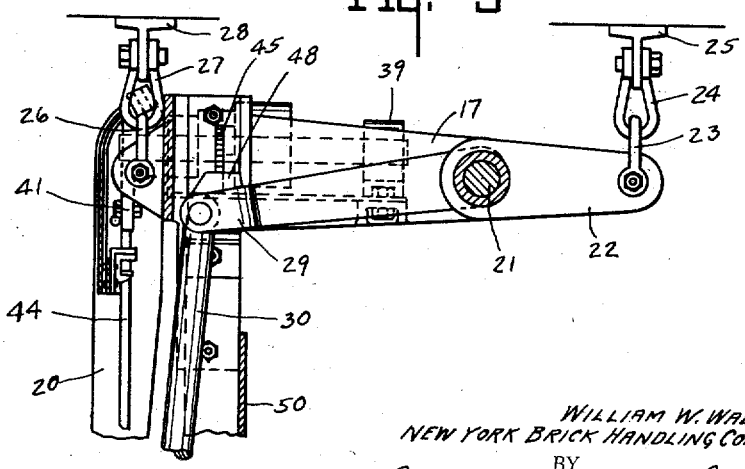
Figure 4:
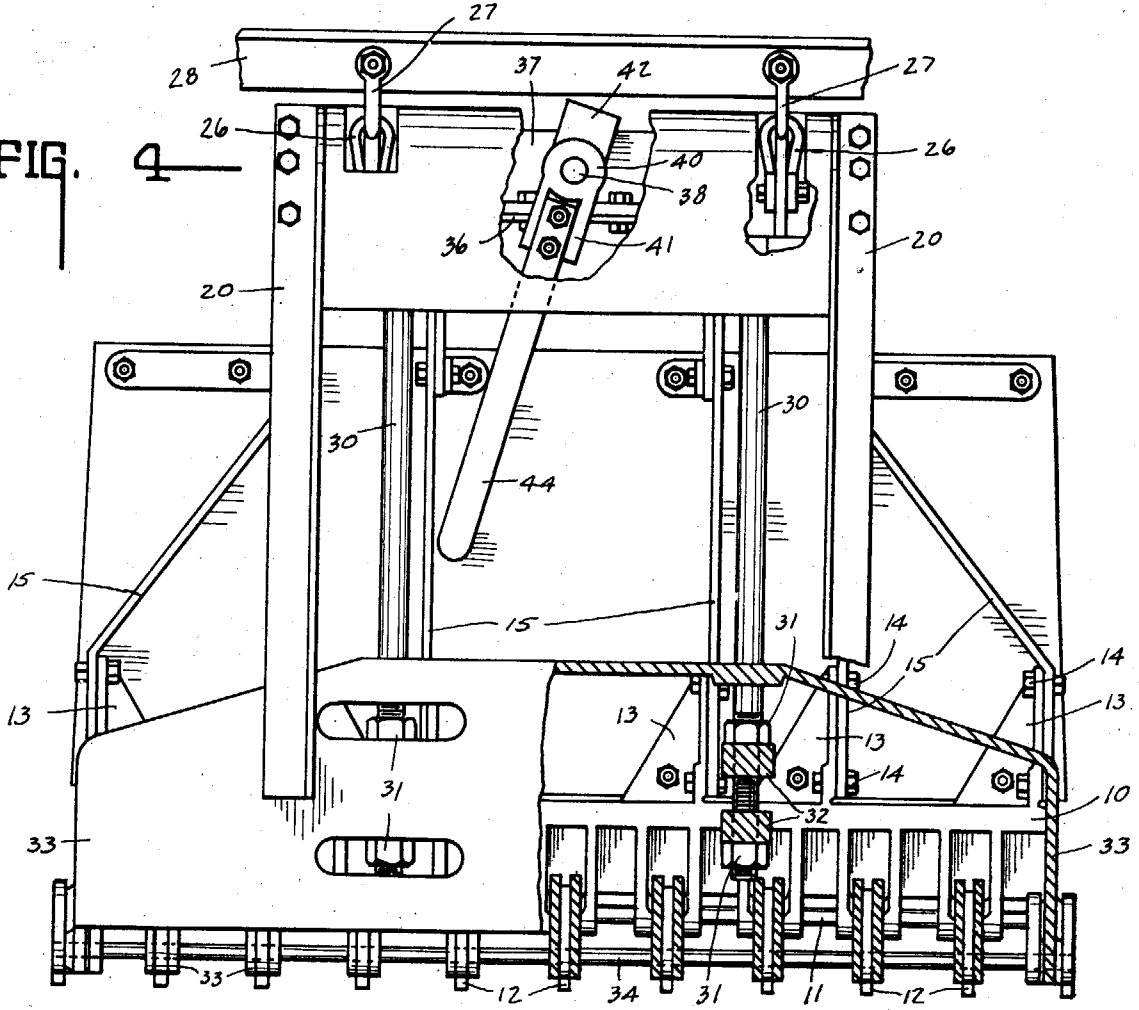

In the accompanying drawings illustrating preferred embodiments of the invention, Figure 1 is a side elevation. Figure 2 is a plan view. Figure 3 is a front elevation. Figure 4 is a rear elevation. Figure 5 is a section on the line 5—5 of Figure 2. Figure 6 is a section on the line 6—6 of Figure 2. Figure 7 is a section on the line 7—7 of Figure 2.

Referring to the drawings, 10 designates a finger bar in which is secured adjacent its lower end a finger hinge rod 11, and on such finger hinge rod is pivotally mounted a plurality of parallelly-arranged lifting fingers 12. Such fingers are commonly known as "dumping fingers" to distinguish from such lifting fingers as are rigidly attached to their supporting frame. Formed integral with and extending upwardly from the body of the finger bar 10 are braces or brackets 13, to which are secured by bolts 14 upwardly-extending frame members 15 of suitable length. Secured to the top of said frame members 15 by bolts 16 are horizontally-extending frame members 17. The finger bar 10, and frame members 15 and 17 constitute a rigid frame upon which the lifting fingers 12 are pivotally supported. The frame members 17 are arranged in pairs and each pair has secured at its rear end a shackle lug plate 18, such plates having formed integral therewith shackle lugs 19. Secured to each of the shackle lug plates 18 and extending downwardly and substantially vertically are guard angles 20. The said guard angles therefore also form a part of the rigid frame of the fork.

Secured in each pair of frame members 17 is a fulcrum shaft 21 and on which fulcrum shaft 21 is rotatably mounted an offset lever 22. Pivotally attached to the outer free end of each lever 22 is a lifting shackle 23 connected by a shackle 24 to a bar 25 that may be attached to any suitable lifting device. Further, pivotally attached to each shackle lug 19 is a lifting shackle 26 pivotally attached to a shackle 27 attached to a bar 28 on the lifting device associated with the bar 25. The shackles 23 and 26 together with the associated members therefor, form a four-point suspension for the apparatus. The other ends of the levers 22 are forked, as indicated at 29, such other ends being part of the lever 22 and formed integrally therewith, and in each forked end is pivotally attached to the upper end of a compression rod 30. The lower ends of these rods 30 are threaded to receive adjusting nuts 31 and pass through inwardly-extending lugs 32 formed integral with and on one face of a finger plate 33. The finger plate 33 is provided on its lower end with a shaft 34, such shaft passing through and pivotally engaging with aligned perforations in a rearward extension 35 on each of the lifting fingers 12. As the levers 22 are rotated on the fulcrum shaft 21, reciprocating motion is imparted to the compression rods 30 and a simultaneous pivoting movement of the lifting fingers 12 takes place about the finger hinge shaft 11.

Secured to the opposing faces of the inner ones of the pairs of horizontal frame members 17 in any suitable manner is a top frame connecting plate 36 and secured to the upper surface of the member 36 and the frame member 17 is a locking latch frame 37, this locking latch frame having formed therein a bearing for a locking shaft 38. Secured to the upper face of the member 36 is a locking latch shaft box 39 acting as a bearing and as a support for the front end of the locking shaft 38. Secured to the rear end of the locking shaft 38 is a locking lever hub 40, on which is formed a downwardly-extending member 41 and an upwardly-extending socket member 42. Secured to the member 41 by bolts 43 is a lever 44, by means of which the locking shaft 38 may be rotated. The socket 42 is adapted to receive the end of any suitable lever, by means of which the shaft 38 may be rotated from the upper end of the apparatus. Formed in the front face of the locking latch frame 37 is a guideway in which are slidably mounted on either side of the locking shaft 38, locking latches 45. Secured to the locking shaft 38 adjacent to the front face of the locking latch frame 37 is a locking latch crank 46, and this crank has pivotally mounted at either end thereof a connecting rod 47. The other ends of these connecting rods 47 are pivotally attached to the locking latches 45. Rotation of the locking shaft 38 will cause a reciprocatory inward or outward movement of the locking latches 45 with respect to such shaft 38 and in alignment with the path of movement of such locking latches are locking notches 48 formed in the forked ends 29 of the levers 22.

When the parts of the device, therefore, are in the position shown in Figure 5, with the levers 22 practically horizontal and with the locking latches 45 in their outward position to engage with the notches 48 in the rear ends of such levers 22, the plurality of parallelly-arranged lifting fingers 12 will be in the full line position shown in Figure 1, and when thus arranged, a load may be placed thereon and carried thereby without danger of dumping the load accidently. If, now, the fork and load are lowered into the container and brought to rest on the bottom thereof, or on brick already placed therein, the strain is removed from the lifting devices to which the bars 25 and 28 are attached and the lever 44 may then be operated to rotate the shaft 38 in the proper direction to retract the locking latches 45 from the notches 48. When the lifting devices are again actuated to raise the fork from the container, the weight of the load of brick on the lifting fingers 12 is sufficient to rotate the lifting fingers 12 about the finger hinge rod 11 so that the fingers assume the position indicated in dotted lines in Figure 1 and the brick are dumped from the fingers. Thus the retraction of the locking latches 45 conditions the apparatus for dumping of brick by the removal of the apparatus from the container.

It will be noted that the distance from the finger hinge rod 11 rearwardly to the shaft 34 on the finger plate 33 is very short, and, therefore, the overall dimension of the device is a minimum. This allows the apparatus to be operated in a relatively small space. It will be seen that all of the operating parts are located within the vertical projection of the frame of the fork when the guard angles 20 are considered as a part of said frame. Thus these parts are protected against injury and undesired actuation by contact with the walls of the container as the device is lowered into the container.

It is found preferable to attach to the front face of the finger bar 10 and the vertical frame members 15 a baffle plate 50 in any suitable manner to prevent bricks or other articles from falling off the load into the mechanism at the rear of the apparatus.

As there is a certain amount of spring in the frame and in the carrying fingers 12, it is necessary to provide adjustment for taking care of this condition in order that the fingers may be in their proper position after a load is placed thereon. In order that this may be accomplished, there are placed on the threaded ends of the rods 30, adjusting nuts 31 which engage with the lugs 32. Therefore, by properly adjusting the nuts 31 on the rods 30 and with relation to the lugs 32, the angular position of the lifting fingers 12 with respect to the framework may be varied as desired. The use of the adjustable compression rod, as above described, is, as far as the inventor was aware, new and novel and it is proposed to claim the same broadly.

By referring to Figure 3, there will be noticed a dot and dash line 51, which touches the upper surfaces of the lifting fingers 12, and further it will be noticed that such line 51 is a curved line and indicates that the upper surfaces of the lifting fingers 12 define a concave surface. It is obvious, therefore, that when a rectangular unit of brick is lifted on the fingers 12, that the middle portion of such unit of brick will rest at a lower level than the outer portions of such unit and there will, therefore, be a tendency for the outer upper edges of the bricks of the unit to move inwardly. This construction, therefore, steadies the unit of brick on the fork and prevents the outer bricks of the unit from falling.

While the drawings and specification herein necessarily show and describe the preferred embodiment of the invention somewhat in detail, it is to be understood that the size, shape and arrangement of parts comprising the device may be varied within wide limits without departing from the spirit of the invention.

In co-pending application, Serial No. 204,217, filed July 8, 1927, of William W. Wallace, there is described and claimed an improved method of operating the fork constituting the present invention.

Having thus described the invention, what is claimed as new is:

1. An improved dumping fork comprising a frame, a plurality of lifting fingers pivotally attached thereto for rotation in vertical planes into and out of horizontal position, lifting mechanism associated therewith, and means associated with the lifting mechanism for rotating said lifting fingers about their pivot point.

2. In an improved dumping fork, the combination of a frame, a plurality of lifting fingers arranged parallel to each other, and pivotally attached at a point intermediate their ends to the frame, a finger plate pivotally attached at one end to one end of the lifting fingers, a lever, connections between the lever and the finger plate, and a locking device associated with said lever for locking the lifting fingers in operative position.

3. In an improved dumping fork, the combination of a frame, a lever pivotally mounted intermediate its ends at the top of said frame, a plurality of parallelly-arranged lifting fingers pivotally mounted intermediate their ends at the bottom of said frame, connections extending between the lifting fingers and lever, and a manually-operable locking device mounted on said frame and co-acting with the lever for locking the lifting fingers in operative position.

4. In a dumping fork, the combination of a frame, lifting mechanism associated therewith, a plurality of lifting fingers pivotally mounted on the frame, controlling means associated with the lifting mechanism for positively operating said lifting fingers, and guard members mounted on said frame for preventing injury to the operating mechanism.

5. In an improved dumping fork, a plurality of pivotally-arranged lifting fingers lying parallel to each other and with the upper surfaces of each succeeding finger from the outside inward with respect to the plurality of fingers at a lower level than the preceding finger.

6. In an improved dumping fork, the combination of a frame, a plurality of lifting fingers pivotally attached thereto at the lower end thereof, said fingers defining by their upper edges a practically concave surface.

7. In an improved dumping fork, the combination of a frame, a plurality of lifting fingers pivotally attached thereto and movable in a vertical plane, controlling mechanism for said lifting fingers pivotally mounted on the frame, said controlling mechanisms being adjustably attached to the lifting fingers, whereby the angle of the lifting fingers with respect to the framework may be adjusted at will.

8. A brick handling fork comprising an upper supporting frame, a vertical frame depending therefrom, a plurality of fingers pivotally mounted to the lower end of said vertical frame and extending substantially horizontally therefrom for supporting a load of bricks, a locking element slidably mounted in said upper supporting frame, and means for operatively connecting said element with said fingers for normally maintaining said fingers in supporting position and releasing said fingers so as to permit them to move about their pivotal mounting into dumping position when actuated.

9. A brick handling fork for loading railroad containers comprising a support having a downwardly-extending portion, brick-supporting fingers pivotally mounted on the lower end of said downwardly-extending portion, means for locking said fingers in brick-supporting position, and releasing means for releasing said locking means to permit dumping of the brick, said releasing means being operable from a point exterior of said railroad container when said brick handling fork is positioned within said container, and said locking means and said releasing means being positioned within the vertical projection of the dimensions of said support.

10. An apparatus for loading brick into railroad containers including a dumping fork adapted to support a stack of brick thereon and adapted to be positioned within said container without dumping of brick, means for so positioning the same, and means for actuating said fork for dumping of brick when so positioned.

11. An apparatus for loading brick into railroad containers including a dumping fork adapted to support a stack of brick thereon and adapted to be positioned within said container without dumping of brick, means for so positioning the same, and means for conditioning said fork when so positioned for dumping of brick by the removal of said fork from said container.

12. An apparatus for loading brick into railroad containers including a dumping fork adapted to support a stack of brick thereon and adapted to be positioned within said container, means for so positioning the same, means for actuating said fork for dumping of brick when so positioned, and means for protecting said actuating means against contact with the sides of said container.

13. An apparatus for loading brick into railroad containers including a dumping fork adapted to support a stack of brick thereon and adapted to be positioned within said container without dumping of brick, and means for actuating said fork for dumping of brick when so positioned.

14. An apparatus for loading brick into railroad containers including a dumping fork adapted to support a stack of brick thereon and adapted to be positioned within said container without dumping of brick, and means for conditioning said fork when so positioned for dumping of brick by the removal of said fork from said container.

15. An apparatus for loading brick into railroad containers including a dumping fork adapted to support a stack of brick thereon and adapted to be positioned within said container, and means for actuating said fork for dumping of brick when so positioned, said actuating means being protected against contact with the sides of said container.

16. An apparatus for loading brick into railroad containers including a frame, a plurality of dumping fingers attached thereto and adapted to support a stack of brick thereon, said frame and said fingers being adapted to be positioned within said container without dumping of brick, and means for actuating said fingers for dumping of brick when so positioned.

17. An apparatus for loading brick into railroad containers including a frame, a plurality of dumping fingers attached thereto and adapted to support a stack of brick thereon, said frame and said fingers being adapted to be positioned within said container without dumping of brick, and means for conditioning said fingers when so positioned for dumping of brick by the removal of said frame and fingers from said container.

18. An apparatus for loading brick into railroad containers including a frame, a plurality of dumping fingers attached thereto and adapted to support a stack of brick thereon, means for locking said fingers to prevent dumping of brick, means for protecting said locking means against contact with the sides of said container, whereby said apparatus may be positioned within said container without dumping of brick, and means for releasing said locking means for dumping of brick when so positioned.

19. Apparatus for loading brick into railroad containers including a frame having an upper portion and downwardly-extending portions fastened thereto, brick stack supporting means pivotally mounted on the lower end of said downwardly-extending portions and mechanism for releasably locking said supporting means in brick-supporting position to support a stack of brick for movement with the frame to a position within the container, said locking mechanism including parts located on the upper portion of said frame and accessible from above for operation thereof to release said locking mechanism and parts extending vertically substantially within the confines of the downwardly-extending portions of said frame, the release of said locking means permitting said supporting means to move relative to the brick stack and the frame, as the loading apparatus is withdrawn from the container.

20. Apparatus for loading brick into railroad containers including a frame having downwardly-extending portions, brick stack supporting means pivotally mounted on the lower end of said downwardly-extending portions, and means including parts extending vertically within the confines of the downwardly-extending portions of the frame for releasably locking said supporting means in brick-supporting position to support a stack of brick for movement with said frame to a position within said container, the release of said locking means permitting said supporting means to move relatively of the frame for dumping of the brick as the loading apparatus is withdrawn from the container.

21. Apparatus for loading brick into railroad containers comprising a frame adapted to be positioned within the container parallel with and closely adjacent to one vertical wall thereof, brick stack supporting means movably mounted on the frame, and means including parts extending vertically along and within the plane of the frame for releasably locking said supporting means against movement relative to the frame to receive a brick stack and support the same for movement with the frame to position within the container, the release of said locking means permitting said supporting means to move relative to the brick stack and the frame, as the loading apparatus is withdrawn from the container.

22. Apparatus for loading brick into railroad containers comprising a frame adapted to be positioned within the container parallel with and closely adjacent to one vertical wall thereof; brick stack supporting means movably mounted on the frame; and means, all of the parts of which are within the vertical projection of the outer dimensions of said frame, for releasably locking said supporting means against movement relative to the frame to receive a brick stack and support the same for movement with the frame to position within the container; the release of said locking means permitting said supporting means to move relative to the brick stack and the frame as the loading apparatus is withdrawn from the container.

23. A brick handling fork for loading railroad containers comprising a frame having a downwardly-extending portion, brick-supporting fingers pivotally mounted on the lower end of said downwardly-extending portion, means for locking said fingers in brick-supporting position, and releasing means for releasing said locking means to permit dumping of brick, said releasing means being positioned so as to be operable from a point exterior of said railroad container when said brick handling fork is positioned within said container and said locking means and said releasing means being positioned within the vertical projection of the outer dimensions of said frame.

24. An improved dumping fork including a finger bar, a plurality of lifting fingers pivotally attached thereto for rotation in vertical planes into and out of horizontal position, means for connecting the fork with lifting mechanism, and means connected with said last-named means for rotating said lifting fingers about their pivot point.

25. In an improved brick handling fork, a plurality of lifting fingers lying parallel with each other and adapted to support a load of brick thereon, the outermost of said fingers having their upper surfaces at a higher level than the remainder of said fingers.

26. In a brick loading fork, a series of lifting fingers disposed in spaced parallel planes to support a load of brick, the individual fingers having their load contacting surfaces relatively positioned to tilt the outer brick of the load inwardly to stabilize the load.

27. Apparatus for loading brick into railroad containers including a frame having an upper portion and downwardly extending portions fastened thereto, brick stack supporting means pivotally mounted on the lower end of said downwardly extending portion, and mechanism including a part connected with said supporting means and also a part located on the upper portion of said frame and accessible from above for operation thereof, for releasably locking said supporting means in brick supporting position to support a stack of brick for movement with the frame to a position within the container, and to release said supporting means for permitting it to move relative to the brick stack and the frame, as the loading apparatus is withdrawn from the container.

In witness whereof, we have hereunto affixed our signatures.

NEW YORK BRICK HANDLING CORPORATION,
*Assignee of William W. Wallace, Deceased,*
By WALTER W. POSEY,
*Pres.*